United States Patent
Kong et al.

(10) Patent No.: US 10,944,116 B2
(45) Date of Patent: Mar. 9, 2021

(54) SEPARATOR, AND FUEL CELL STACK COMPRISING THE SAME

(71) Applicant: LG CHEM, LTD., Seoul (KR)

(72) Inventors: Chang Sun Kong, Daejeon (KR); Hye Mi Jung, Daejeon (KR); Jae Choon Yang, Daejeon (KR)

(73) Assignee: LG CHEM, LTD.

( * ) Notice: Subject to any disclaimer, the term of this patent is extended or adjusted under 35 U.S.C. 154(b) by 96 days.

(21) Appl. No.: 16/465,217

(22) PCT Filed: Nov. 30, 2017

(86) PCT No.: PCT/KR2017/013865
§ 371 (c)(1),
(2) Date: May 30, 2019

(87) PCT Pub. No.: WO2018/101754
PCT Pub. Date: Jun. 7, 2018

(65) Prior Publication Data
US 2020/0006786 A1 Jan. 2, 2020

(30) Foreign Application Priority Data
Dec. 2, 2016 (KR) .................. 10-2016-0163608

(51) Int. Cl.
*H01M 8/00* (2016.01)
*H01M 8/026* (2016.01)
(Continued)

(52) U.S. Cl.
CPC ....... *H01M 8/026* (2013.01); *H01M 8/04291* (2013.01); *H01M 8/04529* (2013.01); *H01M 8/1004* (2013.01); *H01M 8/1018* (2013.01)

(58) Field of Classification Search
CPC ............. H01M 8/1004; H01M 8/0267; H01M 8/04529; H01M 8/026; H01M 8/1018; H01M 2008/1095; Y02E 60/50
See application file for complete search history.

(56) References Cited

U.S. PATENT DOCUMENTS 6,649,297 B1 11/2003 Marchand et al.
2012/0082915 A1 4/2012 Kozakai et al.

FOREIGN PATENT DOCUMENTS

| JP | 2000123848 | 4/2000 |
| JP | 2002270201 | 9/2002 |

(Continued)

OTHER PUBLICATIONS

International Search Report of the International Searching Authority corresponding to International Patent Application No. PCT/KR2017/013865, dated Mar. 15, 2018. (5 pages with English translation).
(Continued)

*Primary Examiner* — Cynthia H Kelly
*Assistant Examiner* — Monique M Wills
(74) *Attorney, Agent, or Firm* — Myers Bigel, P.A.

(57) ABSTRACT

The present invention relates to a separator and a fuel cell stack comprising the same, and according to one aspect of the present invention, there is provided a separator comprising a plurality of channels including a bottom forming a flow space for a reaction gas to flow and a pair of sidewalls connected to the bottom, and a plurality of ribs provided so as to connect the sidewalls of two adjacent channels, wherein the sidewall of the channel is provided with a water storage part which is recessed inward and has a first inclined surface and a second inclined surface connected by a first angle.

18 Claims, 5 Drawing Sheets

(51) Int. Cl.
*H01M 8/04291* (2016.01)
*H01M 8/04492* (2016.01)
*H01M 8/1004* (2016.01)
*H01M 8/1018* (2016.01)

(56) References Cited

FOREIGN PATENT DOCUMENTS

| | | | |
|---|---|---|---|
| JP | 2007115620 | | 5/2007 |
| JP | 2007220570 | | 8/2007 |
| JP | 2010108890 | | 5/2010 |
| JP | 2010251061 | | 11/2010 |
| KR | 100263239 | | 8/2000 |
| KR | 100783843 | * | 12/2007 |
| KR | 1020090040445 | | 4/2009 |
| KR | 101267326 | | 5/2013 |
| KR | 1020130122458 | | 11/2013 |
| KR | 1020140086152 | | 7/2014 |
| KR | 101483488 | | 1/2015 |
| KR | 101483489 | | 1/2015 |
| WO | 2011-013868 | | 2/2011 |

OTHER PUBLICATIONS

Extended European Search Report corresponding to EP 17875729.0, dated Oct. 22, 2019 (8 pp).

* cited by examiner

SEPARATOR, AND FUEL CELL STACK COMPRISING THE SAME

CROSS REFERENCE TO RELATED APPLICATIONS

This application is a 35 U.S.C. § 371 national stage application of PCT International Application No. PCT/KR2017/013865, filed Nov. 30, 2017, which claims priority from Korean Patent Application No. 10-2016-0163608, filed Dec. 2, 2016, the contents of which are incorporated herein in their entireties by reference. The above-referenced PCT International Application was published in the Korean language as International Publication No. WO 2018/101754 A1 on Jun. 7, 2018.

TECHNICAL FIELD

The present invention relates to a separator and a fuel cell stack comprising the same.

BACKGROUND ART

Generally, a fuel cell is an energy conversion device that generates electrical energy through an electrochemical reaction between a fuel and an oxidizer and has an advantage that power can be consistently generated as long as the fuel is continuously supplied.

A polymer electrolyte membrane fuel cell (PEMFC) using a polymer membrane capable of permeating hydrogen ions as an electrolyte, has a low operating temperature of about 100° C. or lower as compared to other types of fuel cells, and has advantages of high energy conversion efficiency, high output density and fast response characteristics. Besides, since it can be miniaturized, it can be provided as portable, vehicle and household power supplies.

The polymer electrolyte fuel cell stack may comprise a membrane-electrode assembly (MEA) having an electrode layer formed by applying an anode and a cathode, respectively, around an electrolyte membrane composed of a polymer material, a gas diffusion layer (GDL) serving to distribute reaction gases evenly over reaction zones and to transfer electrons generated by oxidation reaction of the anode electrode toward the cathode electrode, a separating plate (bipolar plate) for supplying the reaction gases to the gas diffusion layer and discharging water generated by the electrochemical reaction to the outside, and a rubber material gasket having elasticity disposed on the outer circumference of the reaction zone of the separating plate or the membrane-electrode assembly to prevent leakage of the reaction gases and the cooling water.

On the other hand, the polymer electrolyte membrane fuel cell (PEMFC) requires continuous supply of moisture to maintain an ionic conductivity performance of the electrolyte polymer membrane, but the water generated in an excess flow rate and stagnated in a reaction gas flow path causes a problem that hinders movement and discharge of the reaction gas, (for example, flooding).

Also, in order to improve a water discharge performance, separators of various shapes have been developed, but there is no separator which can satisfy both the objects of efficiently discharging water and securing moisture for humidification of the electrolyte membrane simultaneously.

DISCLOSURE

Technical Problem

It is a problem to be solved by the present invention to provide a separator provided so as to be capable of reusing generated water generated in a reaction gas flow path for humidification of an electrolyte membrane without interfering with flow of the reactive gas, and a fuel cell stack comprising the same.

Also, it is another problem to be solved by the present invention to provide a separator capable of effectively discharging generated water and minimizing flooding, and a fuel cell stack comprising the same.

Furthermore, it is another problem to be solved by the present invention to provide a separator capable of improving water management efficiency and minimizing drying of an electrolyte membrane, under a low humidification or no humidification operating condition, and a fuel cell stack comprising the same.

Technical Solution

To solve the above-described problems, according to one aspect of the present invention, there is provided a separator comprising a plurality of channels including a bottom forming a flow space for a reaction gas to flow and a pair of sidewalls connected to the bottom, and a plurality of ribs provided so as to connect the sidewalls of two adjacent channels.

Also, the sidewall of the channel is provided with a water storage part which is recessed inward and has a first inclined surface and a second inclined surface connected by a first angle.

Furthermore, the water storage part may have a wedge shape.

In addition, the first inclined surface and the second inclined surface may have a "V" shape.

The first inclined surface and the second inclined surface may also be composed of flat surfaces.

In addition, a plurality of water storage parts may be each provided on both sidewalls of the channel at predetermined intervals so as to be symmetrical along the flow direction of the reaction gas.

Alternatively, a plurality of water storage parts may be each provided on both sidewalls of the channel at predetermined intervals so as to be asymmetric along the flow direction of the reaction gas.

Also, the first angle may be an acute angle. Furthermore, the sum of the half angle of the first angle and a contact angle of any one inclined surface may be 90° or less.

An inclined angle of the first inclined surface and an inclined angle of the second inclined surface with respect to the sidewall of the channel may be the same size. Alternatively, the inclined angle of the first inclined surface and the inclined angle of the second inclined surface with respect to the sidewall of the channel may have sizes different from each other.

According to another aspect of the present invention, there is also provided a fuel cell stack comprising a membrane-electrode assembly, a gas diffusion layer provided on one side of the membrane-electrode assembly, and a separator provided so as to contact the gas diffusion layer in at least a part of the region. Here, the separator comprises a plurality of channels including a bottom forming a flow space for a reaction gas to flow and a pair of sidewalls connected to the bottom, and a plurality of ribs provided so as to connect the sidewalls of two adjacent channels and to contact the gas diffusion layer. Also, the sidewall of the channel is provided with a water storage part for storing water which is recessed inward and has a first inclined surface and a second inclined surface connected by a first angle. The water may be generated water generated in the channel during operation of the fuel cell stack.

Furthermore, the water storage part may have a wedge shape.

In addition, the first inclined surface and the second inclined surface may be connected so as to have a "V" shape.

The first inclined surface and the second inclined surface may also be composed of flat surfaces.

Furthermore, the water (generated water) in the water storage part may be moved toward the gas diffusion layer and the membrane-electrode assembly along the first and second inclined surfaces. Therefore, the generated water stored in the water storage part may be reused for humidifying the electrolyte membrane.

Advantageous Effects

As described above, the separator related to one embodiment of the present invention and the fuel cell stack comprising the same have the following effects.

It is possible to efficiently distribute the gas flow and the liquid (for example, generated water) flow in the separator, and in particular, to prevent the generated water (condensed water) from flooding in the channel of the separator.

The generated water generated in the reaction gas flow path can be reused for the electrolyte membrane humidification without interfering with the flow of the reaction gas, and the water management efficiency can be improved and the drying of the electrolyte membrane can be minimized, under a low humidification or no humidification condition.

MODE FOR INVENTION

Hereinafter, a separator according to one embodiment of the present invention, a method for manufacturing the same, and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 1:
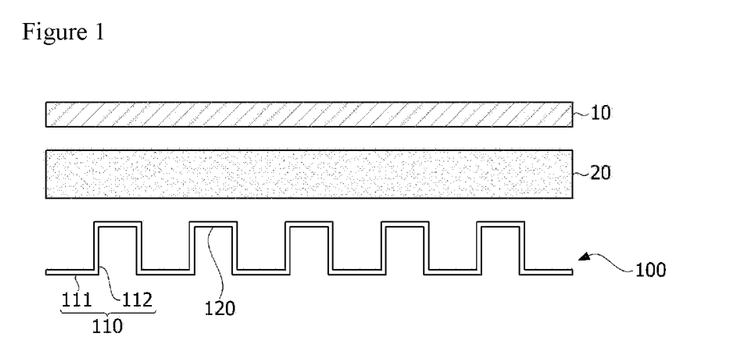
FIG. 1 is a schematic diagram of a fuel cell stack related to one embodiment of the present invention.
Figure 2:
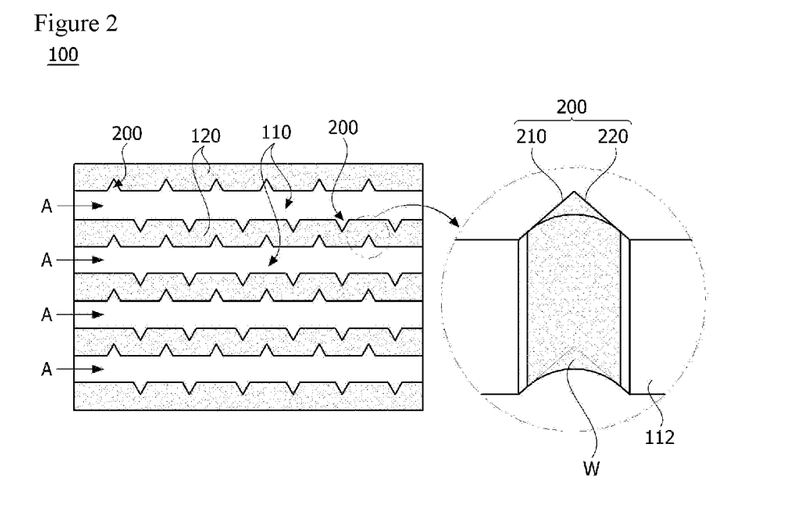
FIG. 2 is a plan view of a separator related to one embodiment of the present invention.

FIG. 1 is a schematic diagram of a fuel cell stack (1) related to one embodiment of the present invention, and FIG. 2 is a plan view of a separator (100) related to one embodiment of the present invention.

Figure 3:
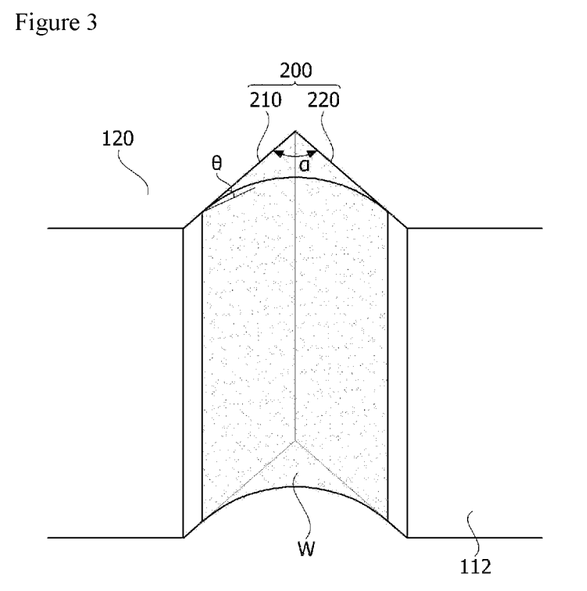
FIGS. 3 and 4 are perspective views of the water storage part shown in FIG. 2.
Figure 4:
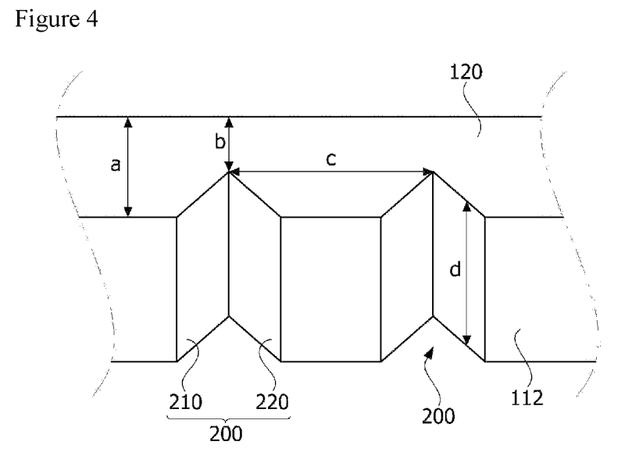
Figure 5:
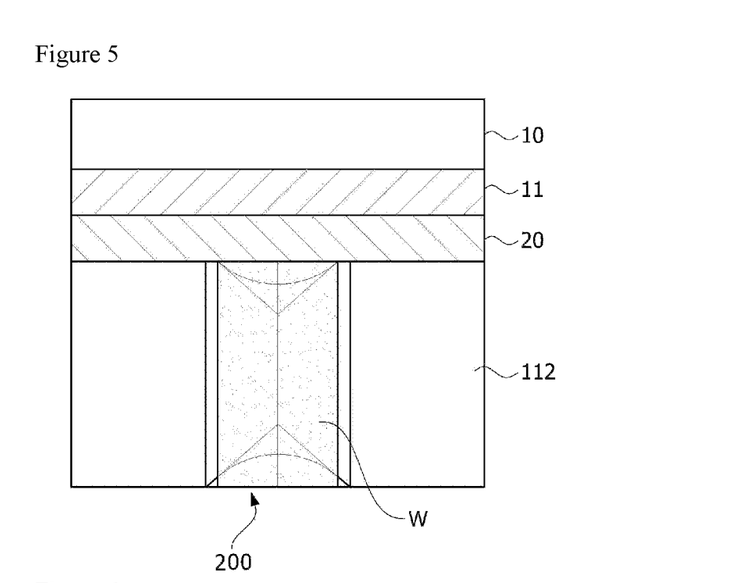
FIG. 5 is a conceptual diagram for explaining one operating state of a fuel cell stack.

FIGS. 3 and 4 are perspective views of the water storage part (200) shown in FIG. 2, and FIG. 5 is a conceptual diagram for explaining one operating state of a fuel cell stack (1).

Figure 6:
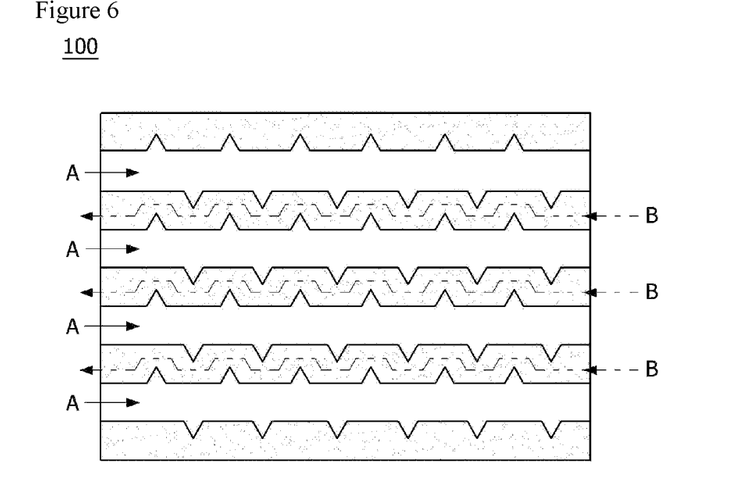
FIG. 6 is a plan view for explaining a reaction gas flow path and a cooling water flow path.
Figure 7:
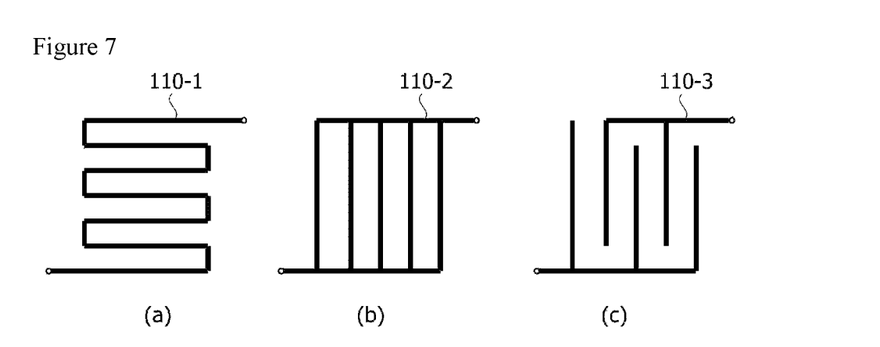
FIG. 7 is schematic diagrams illustrating various forms of channels.
Figure 8:
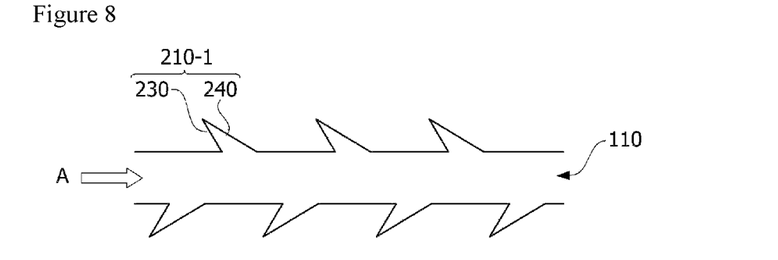
FIGS. 8 and 9 are schematic diagrams for explaining arrangement of a water storage part.
Figure 9:
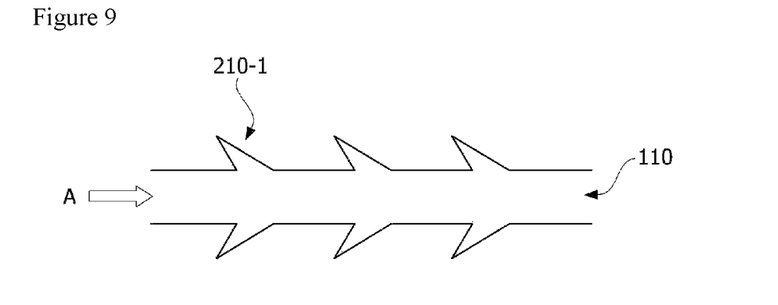

FIG. 6 is a plan view for explaining a reaction gas flow path (A) and a cooling water flow path (B), FIG. 7 is schematic diagrams showing various forms of channels (110-1, 110-2, 110-3), and FIGS. 8 and 9 are schematic diagrams for explaining arrangement of a water storage part.

Figure 10:
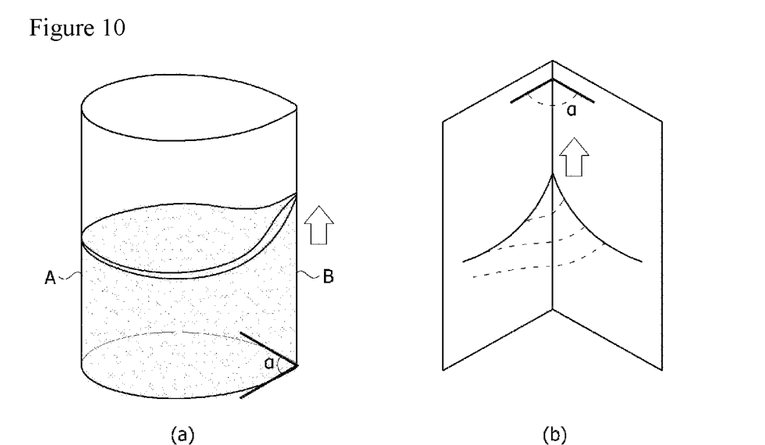
FIGS. 10 and 11 are conceptual diagrams for explaining the principle of rising water in a water storage part.
Figure 11:
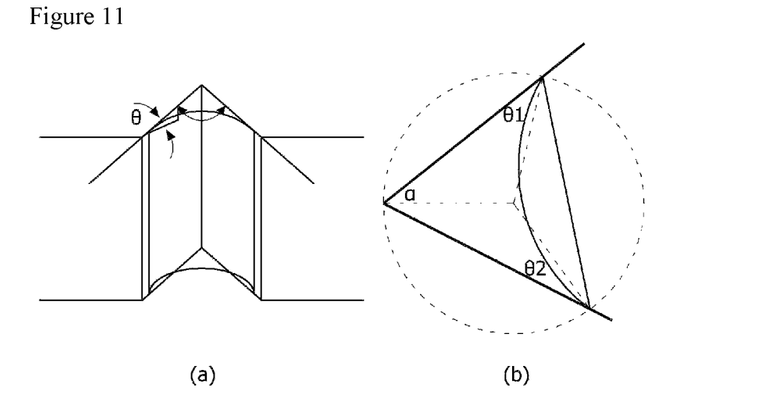

FIGS. 10 and 11 are conceptual diagrams for explaining the principle of raising water (generated water) in a water storage part (200).

The fuel cell stack (1) related to one embodiment of the present invention comprises a membrane-electrode assembly (10) and a gas diffusion layer (20) provided on one side of the membrane-electrode assembly (10), and a separator (100). The separator (100) is disposed to contact the gas diffusion layer (20) in at least a part of the region.

Referring to FIGS. 1 and 2, the separator (100) related to one embodiment of the present invention comprises a plurality of channels (110) including a bottom (111) forming a flow space for a reaction gas to flow and a pair of sidewalls (112) connected to the bottom (111), and a plurality of ribs (120) provided so as to connect the sidewalls (112) of two adjacent channels (110). The channel (110) has a structure opened to the rib (120) side. That is, the channel (110) has a structure opened to the gas diffusion layer (20) side.

The channel (110) may be provided such that the bottom (111) and each sidewall (112) are orthogonal. Also, the bottom (111) of the channel (110) and the rib (120) may be provided in parallel. In addition, each of the ribs (120) is provided so as to be in contact with the gas diffusion layer (20).

The sidewall (112) of the channel (110) is provided with a water storage part (200) which is recessed inward and has a first inclined surface (210) and a second inclined surface (220) connected at a first angle (α). The water storage part (200) provides a predetermined space, where the water (generated water) generated in the channel (110) is stored therein. That is, the generated water generated in the channel (110) is stored in the water storage part (200) so as not to interfere with the flow of the reaction gas.

Also, referring to FIGS. 3 and 5, the generated water staying in the water storage part (200) maintains a water pillar (W) (column) shape, which contacts the gas diffusion layer (20) through the first inclined surface (210) and the second inclined surface (220) and is diffused into the gas diffusion layer (20) and the membrane-electrode assembly (10), which can be used for humidification of the polymer electrolyte membrane. That is, the water in the water storage part (200) is moved toward the gas diffusion layer (20) and the membrane-electrode assembly (10) along the first and second inclined surfaces (210, 220). An unexplained reference numeral 11 denotes a catalyst layer.

Furthermore, the water storage part (200) may have a wedge shape. In addition, the first inclined surface (210) and the second inclined surface (220) may have a "V" shape. In addition, the first inclined surface (210) and the second inclined surface (220) may be comprised of flat surfaces. Besides, a region (boundary region) to which the first inclined surface (210) and the second inclined surface (220) are connected is provided to have a "V" shape, where the boundary region preferably does not comprise a curved portion. However, the region where each inclined surface (210, 220) and the sidewall (112) of the channel (110) are connected may also comprise a curved portion.

Referring to FIG. 3, the first angle ($\alpha$) may be an acute angle. Specifically, the first angle ($\alpha$) represents, for example, an angle formed by two wall surfaces (a first inclined surface and a second inclined surface) of a gap generated in one sidewall (112) of the linear flow path. It is also preferable that the sum of the half angle of the first angle ($\alpha$) and a contact angle ($\theta$) of any one inclined surface is 90° or less. In this case, it is possible to obtain a high effect.

On the other hand, referring to FIGS. 3 and 4, the contact angle ($\theta$) represents an angle that the inclined surface (210 or 220) contacts the water surface. The contact angle ($\theta$) may be adjusted according to the separator (100) material and hydrophilicity (or hydrophobicity) of the gas diffusion layer (20), and design elements such as lengths a, b, c and d, and/or a ratio of a/d. For example, the width (a) and the height (d) of the rib (120), the width (b) of the rib excluding the water storage part (200), and the interval (c) between adjacent water storage parts (200), a and d are factors affecting determination of the first angle ($\alpha$). In addition, the water content in the water storage part (200) may be determined by the first angle ($\alpha$) and the height (d). Also, the length b may be adjusted according to the material of the separator and the manufacturing process and the operating conditions of the fuel cell stack (1).

FIG. 5 illustrates that the water is diffused from the water pillar (W) gathered in the water storage part (200) and used for humidifying the polymer electrolyte membrane (PEM) through the gas diffusion layer (20) and the catalyst layer (11).

Referring to FIG. 6, A represents a flow path and flow direction of the reaction gas, and B represents a flow path and flow direction of the cooling water. That is, it can be provided so that the reaction gas flows through the first surface (the surface on which the channel is opened) of the separator (100), and the cooling water flows through the second surface in the opposite direction of the first surface. In addition, by forming the water storage part (200), the cooling water flow path can generate a long residence time and a complicated fluid flow, so that the cooling effect can be improved. Particularly, the flow (A) of the reaction gas and the flow (B) of the cooling water can be formed in the same direction or in the opposite direction, which can be variously determined according to the arrangement structure of the channels (110) in the separator and the inlet/outlet positions and directions of the reaction gas and the cooling water.

Also, referring to FIG. 7, the water storage part (200) is applicable to various types of channels (110-1, 110-2, 110-3).

On the other hand, referring to FIG. 3, the inclined angle of the first inclined surface (210) and the inclined angle of the second inclined surface (220) with respect to the sidewall (112) of the channel (110) may have the same size. For example, the first inclined surface (210) and the second inclined surface (220) may have symmetrical shapes such as two hypotenuses of an isosceles triangle.

Alternatively, referring to FIG. 8, the inclined angle of the first inclined surface (230) and the inclined angle of the second inclined surface (240) with respect to the sidewall of the channel (110) may have sizes different from each other. That is, the water storage part (210-1) of another embodiment may have an asymmetric shape of the first inclined surface (230) and the second inclined surface (240). In addition, a plurality of water storage parts (210-1) may be each provided on both sidewalls of the channel at predetermined intervals so as to be asymmetric along the flow direction of the reaction gas.

Alternatively, referring to FIG. 9, a plurality of water storage parts (210-1) may be each provided on both sidewalls of the channel at predetermined intervals so as to be symmetrical along the flow direction of the reaction gas.

FIG. 10 shows how the liquid surface in contact with the solid wall surface in the form of a tube behaves according to curvature of the solid wall surface and the liquid contact surface.

Referring to FIG. 10, the A side wall surface has a rounded curved surface, while the B side edge has a wedge shape bent into a V shape. At this time, the liquid surface in contact with the B side wall surface of the liquid surfaces in contact with the solid wall surfaces is raised higher than the A side by a spontaneous capillary phenomenon. If the contact angle at the B side edge decreases, the water remains in the V-shaped space in the form of a water pillar (W) having a negative surface energy, and according to this principle, the inside of the channel (110) serves as a water storage space. If the water storage part (200) has the same curved surface shape as the A side, this phenomenon does not occur.

FIG. 11 is for a more analytical explanation of the explanation via FIG. 10, and when the contact angles ($\theta_1$, $\theta_2$) of the V-shaped wedge with two wall surfaces are different from each other, they have a relationship of Equation 1 below.

$$\alpha + \theta_1 + \theta_2 < \pi \qquad [\text{Equation 1}]$$

At this time, when $\theta = \theta_1 = \theta_2$, it is derived by Equation 2 below.

$$\frac{\alpha}{2} < \frac{\pi}{2} - \theta \qquad [\text{Equation 2}]$$

Therefore, the spontaneous capillary phenomenon occurs more in the V-shaped space than in the round curved surface.

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to efficiently distribute the gas flow and the liquid (for example, generated water) flow in the separator, and in particular, to prevent the generated water (condensed water) from flooding in the channel of the separator.

What is claimed is:

1. A separator comprising a plurality of channels configured to receive a flow of reaction gas, the separator comprising:
   a plurality of bottoms;
   a plurality of pairs of sidewalls, each of the plurality of pairs of sidewalls being connected to a respective one of the plurality of bottoms, and the plurality of channels being defined by the plurality of bottoms and the plurality of pairs of sidewalls; and
   a plurality of ribs, each of the plurality of ribs connecting two adjacent sidewalls of the plurality of pairs of sidewalls,
   wherein each of the plurality of pairs of sidewalls comprises a water storage part that comprises a recess defined by a first inclined surface and a second inclined surface that are connected to each other and form a first angle.

2. The separator according to claim 1, wherein the water storage part has a wedge shape.

3. The separator according to claim 1, wherein the first inclined surface and the second inclined surface form a "V" shape.

4. The separator according to claim 3, wherein the first inclined surface and the second inclined surface are flat surfaces.

5. The separator according to claim 1, wherein both sidewalls of one of the plurality of pairs of sidewalls comprise a plurality of water storage parts that are spaced apart from each other by a predetermined interval, and the plurality of water storage parts are arranged to be symmetrical with respect to a direction of the flow of the reaction gas.

6. The separator according to claim 1, wherein both sidewalls of one of the plurality of pairs of sidewalls comprise a plurality of water storage parts that are spaced apart from each other by a predetermined interval, and the plurality of water storage parts are arranged to be asymmetric with respect to a direction of the flow of the reaction gas.

7. The separator according to claim 1, wherein the first angle is an acute angle.

8. The separator according to claim 7, wherein a sum of half of the first angle and a contact angle of the first inclined surface or the second inclined surface is 90° or less.

9. The separator according to claim 1, wherein a first inclined angle of the first inclined surface and a second inclined angle of the second inclined surface with respect to a corresponding sidewall of the plurality of pairs of sidewalls are equal.

10. The separator according to claim 1, wherein a first inclined angle of the first inclined surface and a second inclined angle of the second inclined surface with respect to a corresponding sidewall of the plurality of pairs of sidewalls are different from each other.

11. A fuel cell stack comprising:
a membrane-electrode assembly;
a gas diffusion layer on the membrane-electrode assembly; and
a separator at least partially contacting the gas diffusion layer,
wherein the separator comprises a plurality of channels for a flow of reaction gas and comprises:
a plurality of bottoms;
a plurality of pair of sidewalls, each of the plurality of pairs of sidewalls being connected to a respective one of the plurality of bottoms, and the plurality of channels being defined by the plurality of bottoms and the plurality of pairs of sidewalls; and
a plurality of ribs, each of the plurality of ribs connecting two adjacent sidewalls of the plurality of pair of sidewalls and contacting the gas diffusion layer, and
wherein each of the plurality of pairs of sidewalls comprises a water storage part that is configured to store for storing water and comprises a recess defined by a first inclined surface and a second inclined surface that are connected to each other and form a first angle.

12. The fuel cell stack according to claim 11, wherein the water storage part has a wedge shape.

13. The fuel cell stack according to claim 11, wherein the first inclined surface and the second inclined surface form a "V" shape.

14. The fuel cell stack according to claim 13, wherein the first inclined surface and the second inclined surface are flat surfaces.

15. The fuel cell stack according to claim 11, wherein movement of the water in the water storage part toward the gas diffusion layer and the membrane-electrode assembly is along the first and second inclined surfaces.

16. The fuel cell stack according to claim 11, wherein the first angle is an acute angle.

17. The fuel cell stack according to claim 16, wherein a sum of half of the first angle and a contact angle of the first inclined surface or a second included surface is 90° or less.

18. The fuel cell stack according to claim 11, wherein the gas diffusion layer extends between the membrane-electrode assembly and the separator.

* * * * *

UNITED STATES PATENT AND TRADEMARK OFFICE
CERTIFICATE OF CORRECTION

PATENT NO. : 10,944,116 B2  
APPLICATION NO. : 16/465217  
DATED : March 9, 2021  
INVENTOR(S) : Kong et al.

Page 1 of 1

It is certified that error appears in the above-identified patent and that said Letters Patent is hereby corrected as shown below:

In the Claims

Column 8, Lines 16-17, Claim 11:
Please correct "configured to store for storing water" to read -- configured to store water --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*